US012070709B2

(12) United States Patent
Bangalore Panneerselvam et al.

(10) Patent No.: US 12,070,709 B2
(45) Date of Patent: Aug. 27, 2024

(54) FILTER INSERT FOR INSTALLATION IN A LIQUID SEPARATOR, LIQUID SEPARATOR, METHOD FOR PROVIDING THE AFOREMENTIONED FILTER INSERT AS WELL AS USE OF THE FILTER INSERT IN A LIQUID SEPARATOR

(71) Applicant: MANN+HUMMEL GmbH, Ludwigsburg (DE)

(72) Inventors: Mohan Bangalore Panneerselvam, Speyer (DE); Klemens Dworatzek, Edingen (DE); Pramod Savadatti, Karnataka (IN); Srinivasa Thontaradhya, Karnataka (IN)

(73) Assignee: MANN+HUMMEL GmbH, Ludwigsburg (DE)

( * ) Notice: Subject to any disclaimer, the term of this patent is extended or adjusted under 35 U.S.C. 154(b) by 318 days.

(21) Appl. No.: 17/571,272

(22) Filed: Jan. 7, 2022

(65) Prior Publication Data
US 2022/0219106 A1   Jul. 14, 2022

(30) Foreign Application Priority Data
Jan. 12, 2021   (DE) .................... 10 2021 100 413.6

(51) Int. Cl.
*B01D 46/00*   (2022.01)
*B01D 46/02*   (2006.01)
*B01D 46/24*   (2006.01)

(52) U.S. Cl.
CPC ..... *B01D 46/0005* (2013.01); *B01D 46/0001* (2013.01); *B01D 46/003* (2013.01); *B01D 46/02* (2013.01); *B01D 46/2414* (2013.01); *B01D 2201/0415* (2013.01)

(58) Field of Classification Search
CPC .............. B01D 46/0001; B01D 46/003; B01D 46/2414
See application file for complete search history.

(56) References Cited

U.S. PATENT DOCUMENTS

| 9,339,750 | B2 | 5/2016 | Eberle | |
| 10,717,033 | B2 * | 7/2020 | Panni | ................. B01D 46/0005 |
| 11,154,805 | B2 * | 10/2021 | Nimtz | ................ B01D 46/2403 |

FOREIGN PATENT DOCUMENTS

| CN | 201470260 U | 5/2010 |
| DE | 102013020502 A1 | 6/2015 |
| DE | 102017011691 A1 | 6/2019 |
| JP | 2015105606 A | 6/2015 |
| WO | 2005068051 A1 | 7/2005 |

* cited by examiner

*Primary Examiner* — Robert A Hopkins

(57) ABSTRACT

A filter insert to be installed in a housing of a liquid separator has a hollow cylindrical separation element in the form of a coalescer for separating a liquid from a gas flow. A flange at an end face of the hollow cylindrical separation element can be arranged exchangeably between a cover and a cylindrical body of the housing. The flange has a support surface at a radially outer rim of the flange to be supported on an upper support region of the housing facing the cover of the housing. The flange has a guide structure determining a position of the flange on the upper support region of the housing. The guide structure is to receive a counter structure of the liquid separator. The guide structure has an axial elevation projecting away from the end face of the separation element. A liquid separator is provided with such a filter insert.

15 Claims, 10 Drawing Sheets

FILTER INSERT FOR INSTALLATION IN A LIQUID SEPARATOR, LIQUID SEPARATOR, METHOD FOR PROVIDING THE AFOREMENTIONED FILTER INSERT AS WELL AS USE OF THE FILTER INSERT IN A LIQUID SEPARATOR

CROSS-REFERENCE TO RELATED APPLICATION

This application claims a priority date of 12 Jan. 2021 based on prior filed German patent application No. DE 10 2021 100 413.6, the entire contents of the aforesaid German patent application being incorporated herein by reference to the fullest extent permitted by the law.

BACKGROUND OF THE INVENTION

The invention concerns a filter insert for installation in a housing, in particular in a pressure-resistant container, of a liquid separator, comprising
  at least one separation element configured as a hollow cylindrical coalescer configured for separation of liquid, in particular of oil and/or oil aerosol from a gas flow, and
  a flange arranged at an end face at the separation element that can be arranged exchangeably between a cover of the housing and a cylindrical body of the housing, wherein the flange comprises at its radially outer rim a support surface that is configured to be supported on an upper support region of the housing facing the cover.

The invention concerns also a liquid separator comprising a housing with a housing opening, a cylindrical housing body, and a cover configured for closing the housing opening, and a filter insert arranged in the housing.

The invention further concerns a method for providing a filter insert of the aforementioned kind for installation in a liquid separator of the aforementioned kind.

Liquid separators, for example, air/oil separator elements for separating oil aerosol from air, can be employed, for example, for separating oil from compressed air in compressed air systems which are supplied by an oil-lubricated connection element, for example, a compressor or a vacuum pump.

Such a liquid separator comprises a filter insert configured for separating oil from air and a pressure-resistant container of the connection element.

The air laden with oil flows via a raw air inlet into the pressure-resistant container in order to flow subsequently through the filter insert, which comprises at least one filter element or separation element configured for separating oil from raw air, for example, a main separator and an after separator, and to finally leave the housing in the purified state via the clean air outlet.

The filter insert functions according to the coalescence principle. The at least one hollow cylindrically configured filter element is configured as a hollow cylindrical coalescer that combines the fine oil droplets to larger oil drops that, due to gravity, precipitate downwardly in the air/oil separation element and downstream thereof. The precipitated oil drops are drained by means of at least one drainage line or at least one drainage tube.

The printed publication DE 10 2014 002719 A1 discloses a filter insert of the aforementioned kind. In this filter insert, the flange is shaped stair-like in longitudinal section and comprises two stair-like steps. The radially outer stair-like step is positioned with its two surfaces arranged at a right angle relative to each other directly at the cylindrical housing body so that the filter insert is arranged centered in the housing body. The radially inner stair-like step covers the separation element.

In predetermined servicing intervals, the separation element is to be exchanged. In this context, the length of the servicing intervals varies depending on the configuration of the separation element or depending on the configuration of the liquid separator.

The invention has the object to further develop a filter insert of the aforementioned kind as well as a liquid separator of the aforementioned kind in such a way that the filter insert can be installed in a particularly simple and error-free way in the housing of the liquid separator. In particular, it is to be differentiated whether the filter insert is configured for installation in the liquid separator. For example, it is to be ensured that the filter insert can be operated only in a liquid separator that matches it.

SUMMARY OF THE INVENTION

This object is solved by a filter insert of the aforementioned kind that is characterized in that the flange comprises at least one guide structure configured for determining the position of the flange on the support region, wherein the guide structure is at least one groove-like axial elevation of the flange projecting away from the end face of the separation element that is configured to receive substantially with precise fit at least one counter structure correlated with the liquid separator.

This object is solved by a liquid separator of the aforementioned kind that is characterized by comprising a filter insert in accordance with the invention arranged in the housing.

Advantageous embodiments and expedient further developments of the present invention are characterized in the respective dependent claims.

The present invention is based on the flange of the filter insert comprising at least one guide structure which can be engaged by at least one counter structure of the liquid separator that is complementary to the guide structure. In this context, guide structure and counter structure are configured in the manner of a lock-and-key principle. The guide structure of the flange is a groove-like axial elevation of the flange that is projecting away from the end face of the separation element. This type of the guide structure has the effect that the support surface of the flange can be arranged on the support region of the housing only when the guide structure and the counter structure are arranged so as to spatially match each other, in particular when the counter structure engages the guide structure. In this manner, it can be ensured that only a matching filter insert can be used in a specific liquid separator.

In the present invention, due to the shape of the guide structure, the housing cover can be arranged in a closing manner on the housing body only when the guide structure and the counter structure are arranged so as to spatially match each other. The housing opening thus cannot be closed by the housing cover when the flange is arranged between the housing cover and the housing body and in this context the guide structure and the counter structure are not arranged so as to spatially match each other because then the counter structure keeps the support surface of the flange at a distance from the support surface of the housing body.

In order to reliably prevent collection of condensed water in the guide structure, the latter is advantageously configured open toward the support region of the housing in the position of use of the flange.

In a particularly advantageous embodiment of the present invention, the guide structure is an annular elevation of the flange arranged concentrically about a central cutout of the separation element. This has the advantage that the guide structure is configured such that the separation element is centered upon insertion of the filter insert into the housing of the liquid separator. In this context, the central cutout of the separation element can be configured as an outflow opening. The radially inner rim of the flange can be designed to delimit the outflow opening of the filter element. For example, the flange can be formed of sheet metal that comprises a central cutout and whose inner rim bordering the cutout is crimped.

The counter structure of the liquid separator that can be arranged in the guide structure can be arranged concentrically at the cylindrical housing body. This has the effect that, by means of a spatially matching arrangement of the guide structure and of the counter guide structure relative to each other, the separation element can be arranged centered in the housing or can be arranged coaxially to the cylindrical housing body.

In a liquid separator in which the air laden with oil flows spirally through an annular gap arranged between housing body and filter element before it enters the separation element, a person of skill in the art will be particularly appreciative when the guide structure aids in centering the separation element in the housing body because in such a liquid separator centering of the separation element is required so that the separation element is uniformly exposed to the incoming gas flow.

In a particularly advantageous embodiment of the present invention, thus
- the support surface of the flange is arranged radially displaced relative to the separation element such that the separation element can be arranged at a distance from the cylindrical housing body, wherein between the cylindrical housing body and the hollow cylindrical separation element an annular gap is formed that can be flowed through spirally by the air laden with liquid flowing through the housing body,
- the guide structure is an annular groove-like elevation of the flange that is concentrically arranged about a central cutout of the separation element, and
- the counter structure is a groove-like counter elevation of the housing body concentrically arranged at the cylindrical housing body of the liquid separator and/or a concentrically configured groove-like counter elevation of an air guide element arranged in the housing body.

In an advantageous embodiment of the present invention, the guide structure is shaped such that it projects past the support surface of the flange in the axial direction. For example, the guide structure can project past all other regions of the flange in the axial direction. The guide structure can thus be a region of the flange which comprises the largest axial distance from the separation element. In this way, a counter structure interacting with the guide structure can also be arranged in the housing cover. In this manner, by means of the guide structure, the position of the flange relative to the housing cover can also be determined in addition to the position of the flange relative to the housing body.

Independent thereof or in combination therewith, in an advantageous embodiment of the present invention at least one seal element is captively arranged at the support surface of the flange. In this context, the seal element is arranged such at the support surface that, in the position of use of the filter insert, it is arranged between the flange and the housing of the liquid separator and seals the housing relative to the ambient pressure. Providing a seal element at the support surface of the flange in the present invention has the advantage that, upon insertion of the flange into the liquid separator, the seal element can be arranged in its correct sealing position by means of a spatially matching arrangement of the guide structure of the flange and of the counter structure of the liquid separator to each other. During insertion of the filter insert into the liquid separator, the guide structure thus assists in guiding the seal element into its correct sealing position. In that the guide structure prevents a wrong insertion of the seal element, it increases the operational safety of the liquid separator.

The seal element can be, for example, a flat seal, an O-ring or an L-shaped seal ring. In particular, the seal can be designed L-shaped in longitudinal section and can be arranged at the radially outer rim of the flange.

Advantageously, the seal element is a fixed component of the filter insert, in particular is captively arranged at the filter insert. This facilitates working steps upon exchange of the filter insert because in this way no separate seal exchange is required.

In an advantageous embodiment of the liquid separator according to the present invention,
- the support surface of the flange in the closed state of the housing is clamped between the housing cover and the housing body,
- at least one flange cutout is arranged at the housing configured for receiving the support surface, and
- the radius of the flange is smaller than the radius of the housing in such a way that, in the closed state of the housing, the housing cover is resting directly on the housing body at a radially outer region of the housing bordering the flange cutout.

The liquid separator comprises advantageously a raw air inlet arranged tangentially at the cylindrical housing body that is connectable to a liquid-lubricated connection element of a compressed air system, in particular to an oil-lubricated compressor, and that is configured to enable inflow of compressed air, laden with liquid and originating from the connection element, tangentially into the cylindrical housing body.

Moreover, the liquid separator comprises advantageously an annular gap that is arranged between the cylindrical housing body and the separation element of the filter insert. In this context, the liquid separator is configured such that the air flowing in through the raw air inlet flows spirally through the annular gap and flows into the separation element of the filter insert in a region facing away from the cover.

The counter structure of the liquid separator as well as the support region of the housing body can be arranged at a region of the cylindrical housing body facing the flange in the position of use. This has the advantage that the guide structure and the counter structure upon insertion of the filter insert into the liquid separator interact such that the distance of the separation element from the housing body is determined, in particular the separation element is centered in the housing body.

Optionally, at least one air guide element configured for guiding the air flowing through the housing body, in particular an air baffle, can be arranged between the housing body and the separation element. The air guide element is thus arranged upstream of the separation element in the cylindrical housing body in the flow path of the air laden with liquid.

The air guide element can be an element which is independent of the housing body. Upon insertion of the air guide element into the housing body, it is important to center it properly because

- the distance between the housing body and the air guide element defines the degree of preseparation of the liquid separator, and
- the distance between the air guide element and the separation element defines the velocity at which the air laden with liquid flows into the separation element.

It is thus required to properly center the air guide element in the housing body so that the desired preseparation degree is achieved and inflow at the separation element is uniform.

As a supplement or as an alternative to the housing body, the counter structure of the liquid separator can be arranged in a region of the air guide element that is facing the flange in the position of use. In this embodiment, the guide structure of the flange is arranged at the counter structure of the air guide element and the counter structure of the air guide element is arranged at the support region of the housing body. An arrangement of the counter structure at the air guide element has the advantage that the guide structure and the counter structure upon insertion of the filter insert into the liquid separator interact with each other such that the distance of the air guide element from the separation element is determined. Therefore, no erroneous positioning of the separation element relative to the air guide element can occur.

The present invention concerns moreover a method for providing a filter insert of the aforementioned kind for installation in a liquid separator of the aforementioned kind.

The present invention concerns finally the use of a filter insert of the aforementioned kind in a liquid separator of the aforementioned kind, for separation of oil from compressed air, wherein the liquid separator is correlated with a compressed air system that is supplied by an oil-lubricated connection element, for example, by a compressor or by a vacuum pump.

BRIEF DESCRIPTION OF THE DRAWINGS

As already discussed above, there are various possibilities of configuring and further developing the teaching of the present invention in an advantageous manner. For this purpose, on the one hand, reference is being had to the independent and dependent claims, and, on the other hand, further embodiments, features, and advantages of the present invention will be explained in more detail in the following inter alia with the aid of the two embodiments illustrated in the FIGS. 1 to 10.

Same or similar configurations, elements or features are provided in the FIGS. 1 to 10 with identical reference characters.

DESCRIPTION OF PREFERRED EMBODIMENTS

For avoiding superfluous repetitions, the following explanations with regard to the configurations, features, and advantages of the present invention (in so far as not disclosed otherwise) refer to the liquid separator 200 illustrated in FIGS. 3, 4, 7, and 9 as well as to the liquid separator 202 illustrated in FIGS. 5, 6, 8, and 10.

Figure 1:
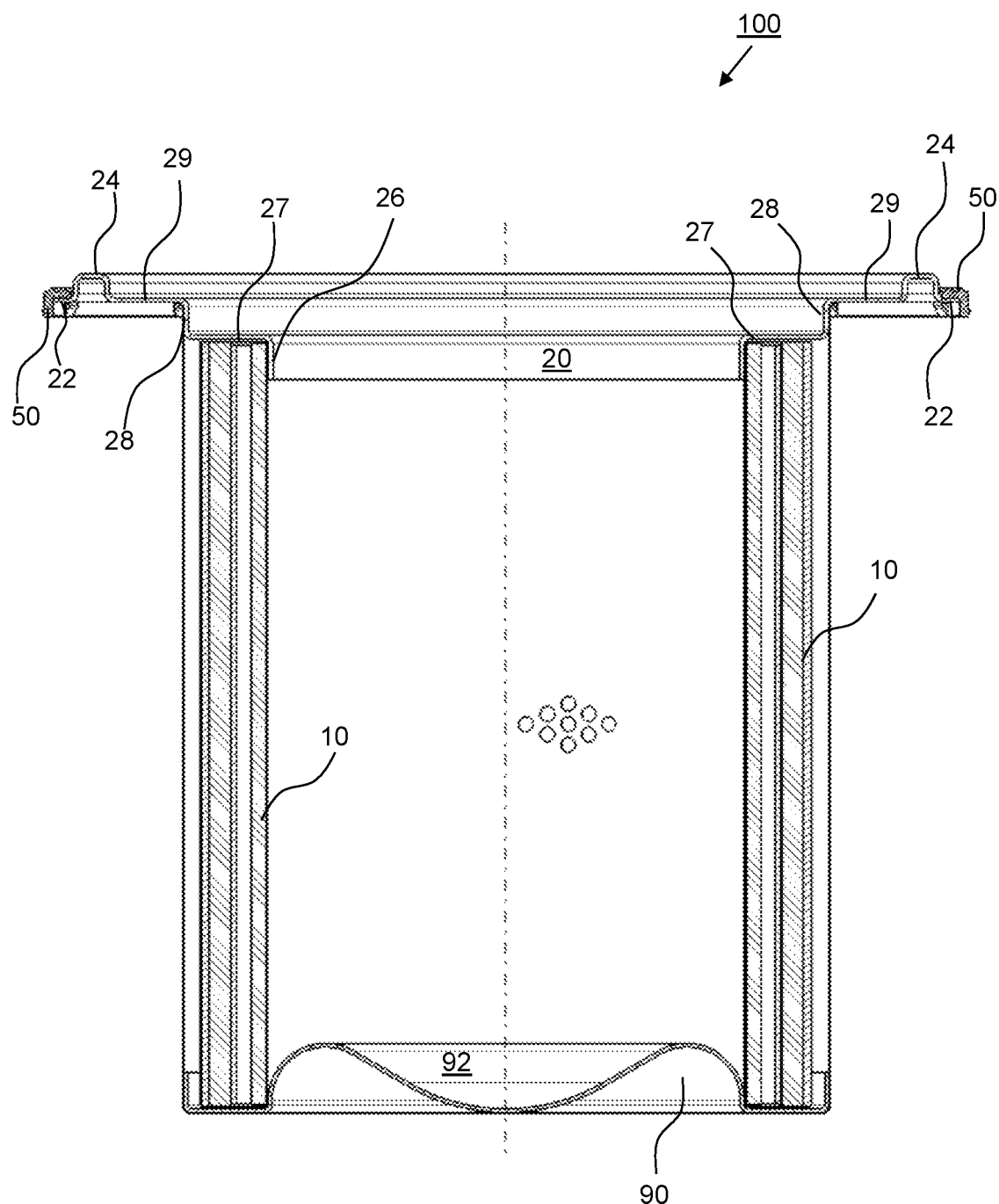
FIG. 1 shows in longitudinal section illustration an embodiment for a filter insert according to the present invention which is provided according to the method according to the present invention.
Figure 2:
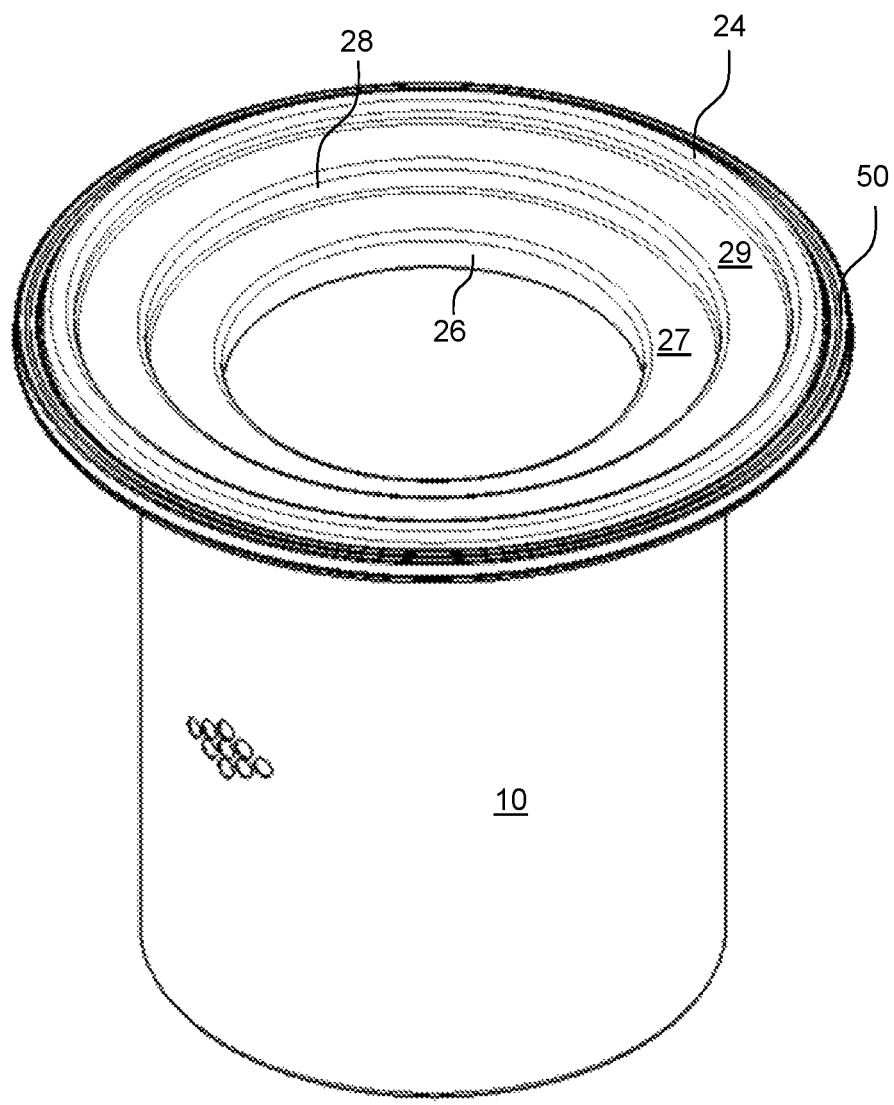
FIG. 2 shows in perspective illustration the filter insert of FIG. 1.

The filter insert 100 illustrated in FIG. 1 comprises a hollow cylindrical separation element 10 that is configured to separate oil and/or oil aerosol from a gas flow by means of the coalescence principle. The separation element 10, as illustrated in FIG. 1, can comprise a plurality, for example two, filter layers which can be formed of the same or of different materials, for example, of glass fiber and/or of plastic material, for example, of nonwoven.

As illustrated in FIGS. 7 to 10, the filter insert 100 can be installed exchangeably in a pressure-resistant housing of a liquid separator 200, 202. For installation in the housing of the liquid separator 200, 202, the filter insert 100 comprises a flange 20 arranged at the end face at the separation element 10 and clamped between a cover 30 and a cylindrical body 40 of the housing of the liquid separator 200, 202. The cover 30 can be removed, in particular can be screwed onto the pressure-resistant container.

The housing of the liquid separator 200, 202 has a raw air inlet 70 which is arranged tangentially and which is connected to a connection element, for example, to a compressor screw. When presently reference is being had to tangential, radial, axial, coaxial or circumferential or the like, this relates to, if nothing different is mentioned, the longitudinal axis of the liquid separator 200, 202.

By means of the raw air inlet 70, compressed air laden with oil aerosol enters the housing of the liquid separator 200, 202 and flows then spirally through an annular gap 60 that is arranged between the housing body 40 and the separation element 10 before it flows in a lower region facing away from the cover 30 into the separation element 10 of the filter insert 100 and then flows radially through it from the exterior to the interior.

The purified clean air flows in axial direction out of the housing of the liquid separator 200, 202. For discharging the clean air, the housing cover 30 comprises a central clean air outlet 72. The flange 20 is arranged coaxially to the clean air outlet 72 of the liquid separator 200, 202.

In longitudinal section, the flange 20 comprises two stair-like sequentially arranged steps. The axially extending region 26 of the radially inner step is contacting the central cutout of the hollow cylindrical separation element 10. The radially extending region 27 of the radially inner step covers the end face of the separation element 10. At the radially extending region 29 of the outer step, the flange 20 comprises at least one guide structure, namely a groove 24, for securing the position of the flange 20 on the housing body 40. This groove 24 centers the filter insert 100 in the housing body 40.

At the outer rim of the radially extending region 29 of the outer step, a seal element 50 is arranged for sealing the housing 30, 40 relative to the ambient pressure.

The oil that is separated by the separation element 10 of the filter insert 100 collects in the interior of the cylindrical filter insert 100 at a bottom-side end disk 90, in particular in an oil collecting region 92 of the bottom-side end disk 90 that is arranged radially within the filter insert 100, and can be discharged, for example, through a drainage tube element (not illustrated) and returned to the connection element.

At the bottom of the housing body 40, oil collects in a bottom-side oil collection volume 110 that is separated by a preseparation action of the housing, in particular by gravity and by centrifugal force for tangential inflow of the raw air. The pre-separated oil collecting in the oil collection volume 110 can also be returned to the connection element, for example, by a liquid outlet (not illustrated) configured for draining the liquid collecting in the housing.

Figure 3:
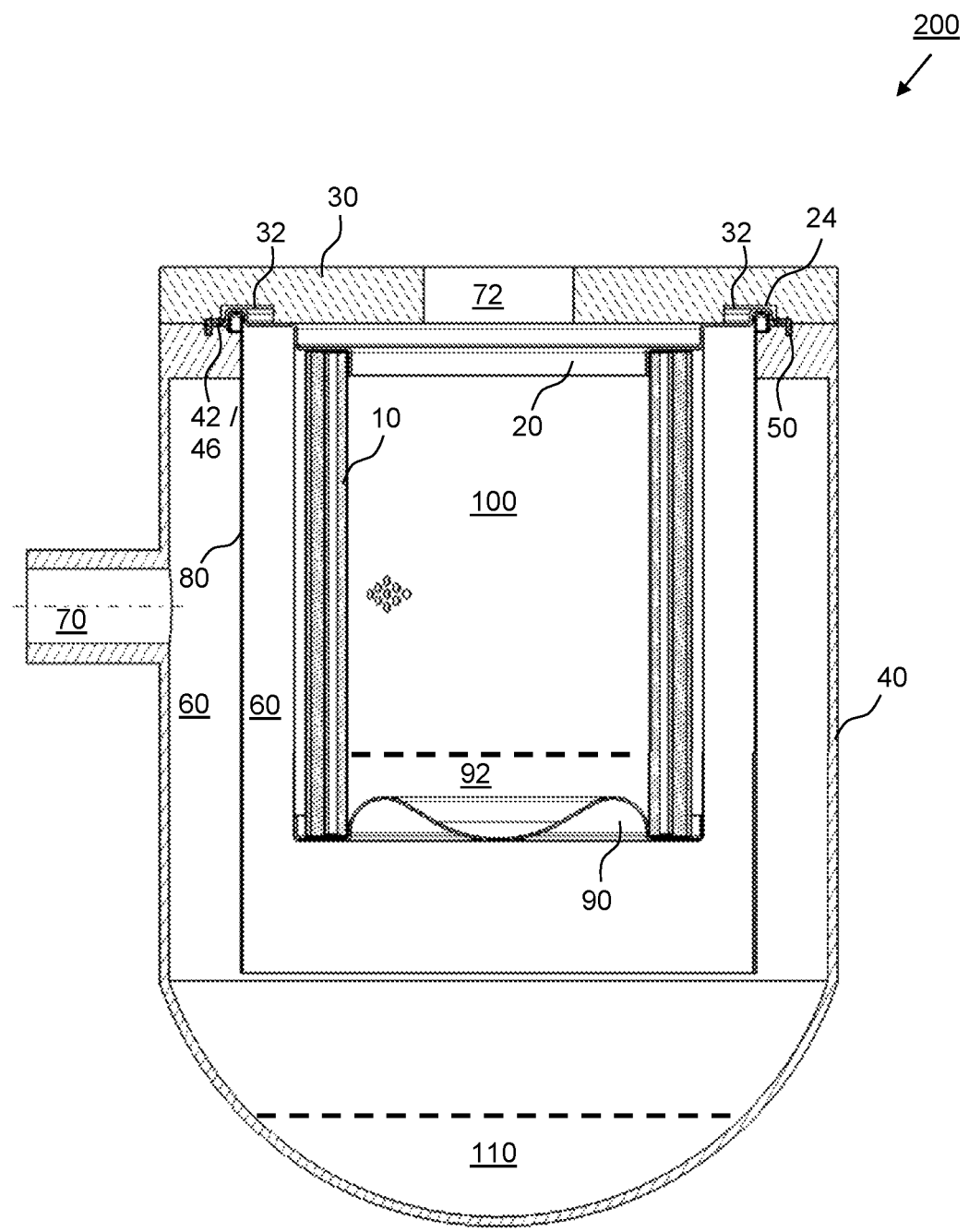
FIG. 3 shows in longitudinal section illustration a first embodiment for a liquid separator according to the present invention, wherein the liquid separator comprises the filter insert of FIG. 1.
Figure 5:
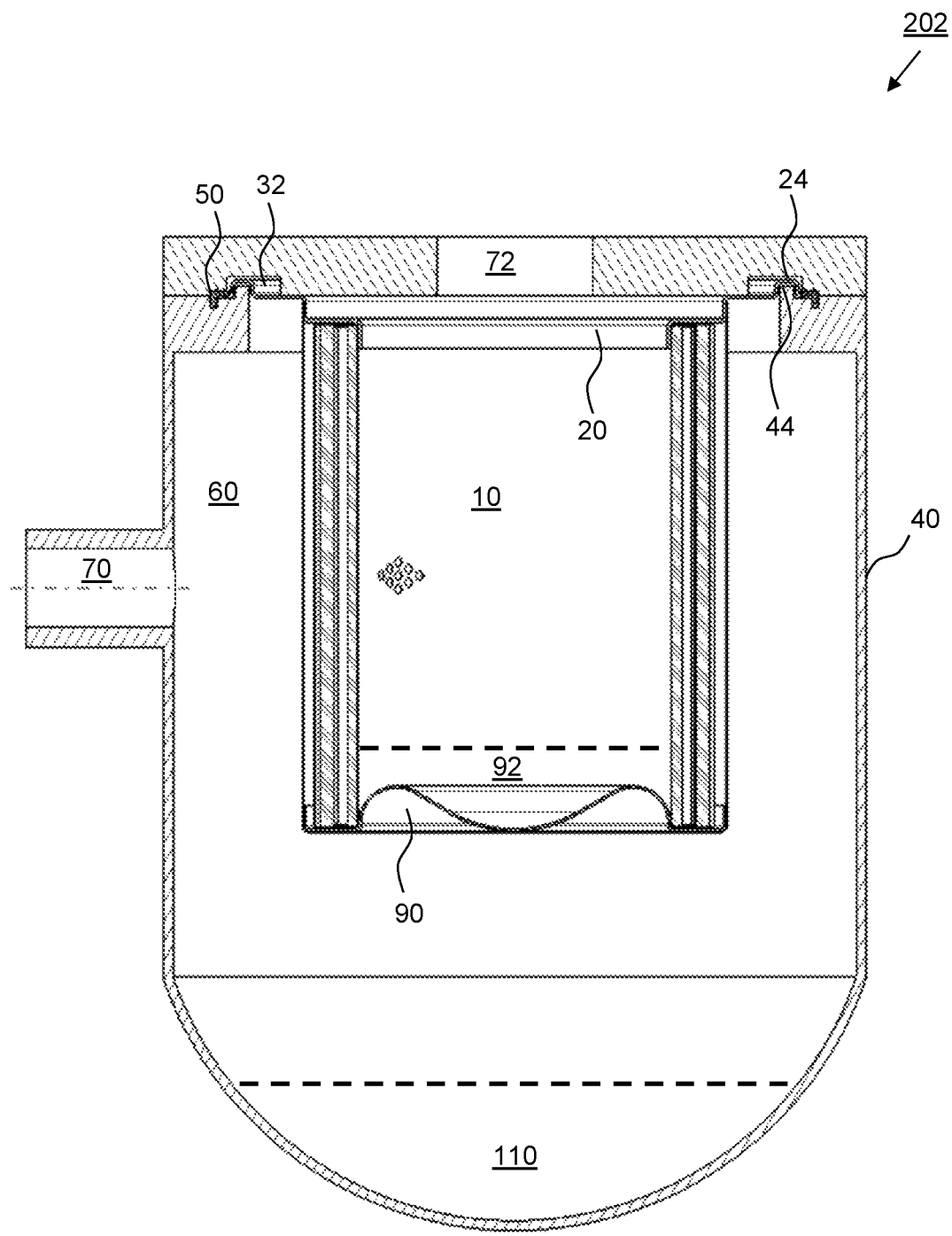
FIG. 5 shows in longitudinal section illustration a second embodiment for a liquid separator according to the present invention, wherein the liquid separator comprises the filter insert of FIG. 1.

The groove 24 defines the position of the flange 20 on the upper support region 42 and thus also the arrangement of the separation element 10 relative to the housing body 40. In order to be able to determine the position of the flange 20 on the support region 42 of the housing body 40, the groove 24 is at least one axial elevation of the flange 20 that is projecting away from the end face of the separation element 10 and is configured to receive substantially with precise fit at least one counter groove 44 correlated with the liquid separator 200, 202. In cross section, the groove 24 is n-shaped. As is illustrated in FIGS. 3 and 5, the groove 24 is arranged displaced radially as well as axially relative to the separation element 10.

The counter groove 44, as illustrated in FIGS. 3, 4, 7, and 9, can be arranged at an air baffle 80 which is arranged at the housing body 40. Such an air baffle 80 must be centered well relative to the filter insert 100 because the dimension of the annular gap 60 between the housing body 40 and the air baffle 80 defines the acceleration of the air flowing through this annular gap 60, and the dimension of the annular gap 60 between the air baffle 80 and the separation element 10 determines whether the air flows uniformly into the separation element 10.

When the counter groove 44 is arranged at the air baffle 80, the groove 24 assists in centering the air baffle 80 relative to the separation element 10 when inserting the filter insert 100 into the housing.

In addition to this or as an alternative thereto, the counter groove 44, as illustrated in FIGS. 5, 6, 8, and 10, can be arranged at the housing body 40. This has the advantage that the groove 24 assists in centering the separation element 10 relative to the housing body 40 when inserting the filter insert 100 into the housing.

Figure 4:
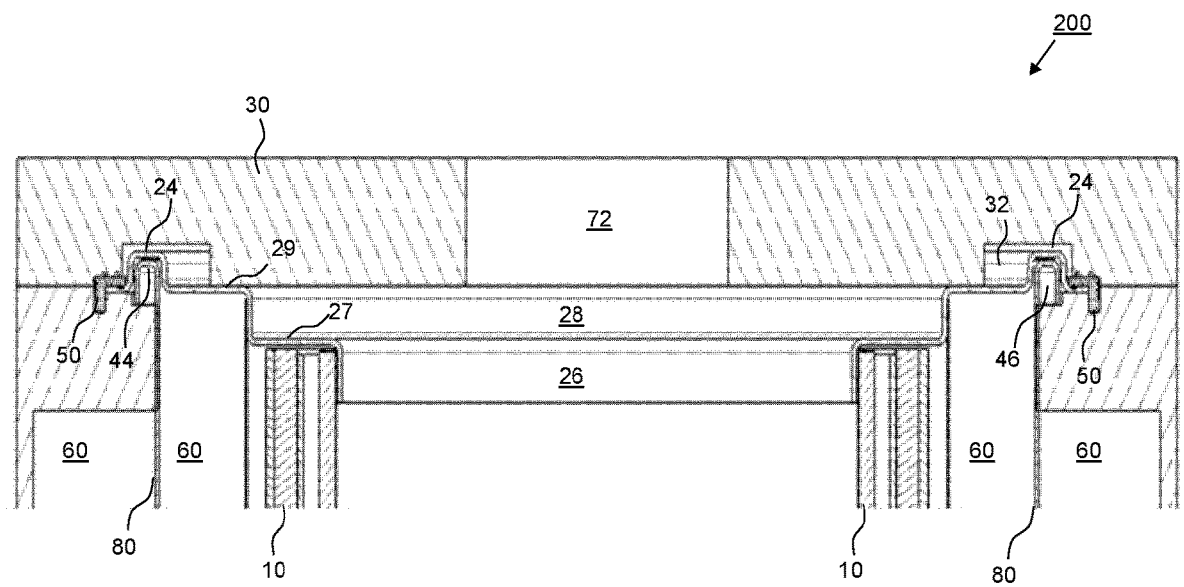
FIG. 4 shows a detail view of the flange region of the liquid separator of FIG. 3.
Figure 6:
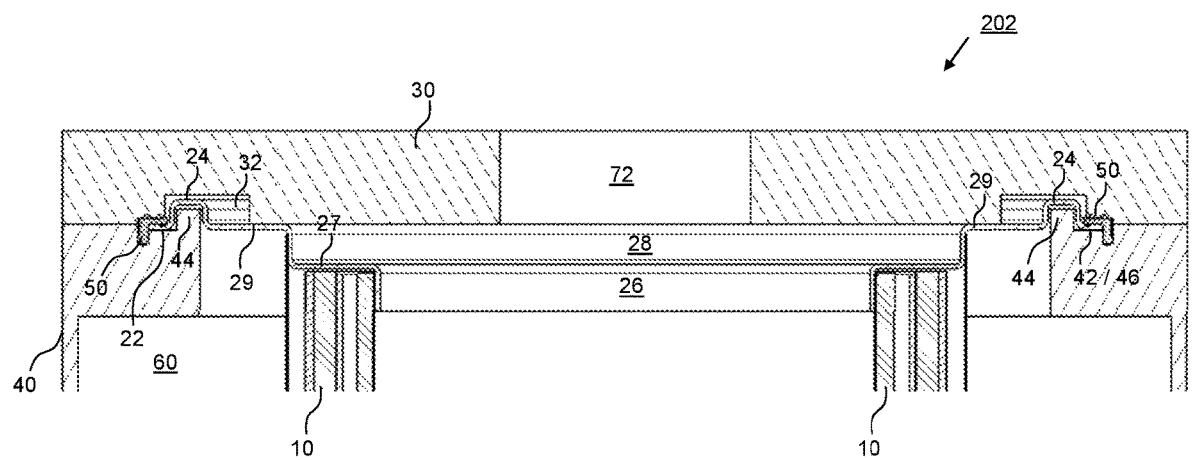
FIG. 6 shows a detail view of the flange region of the liquid separator of FIG. 5.
Figure 7:
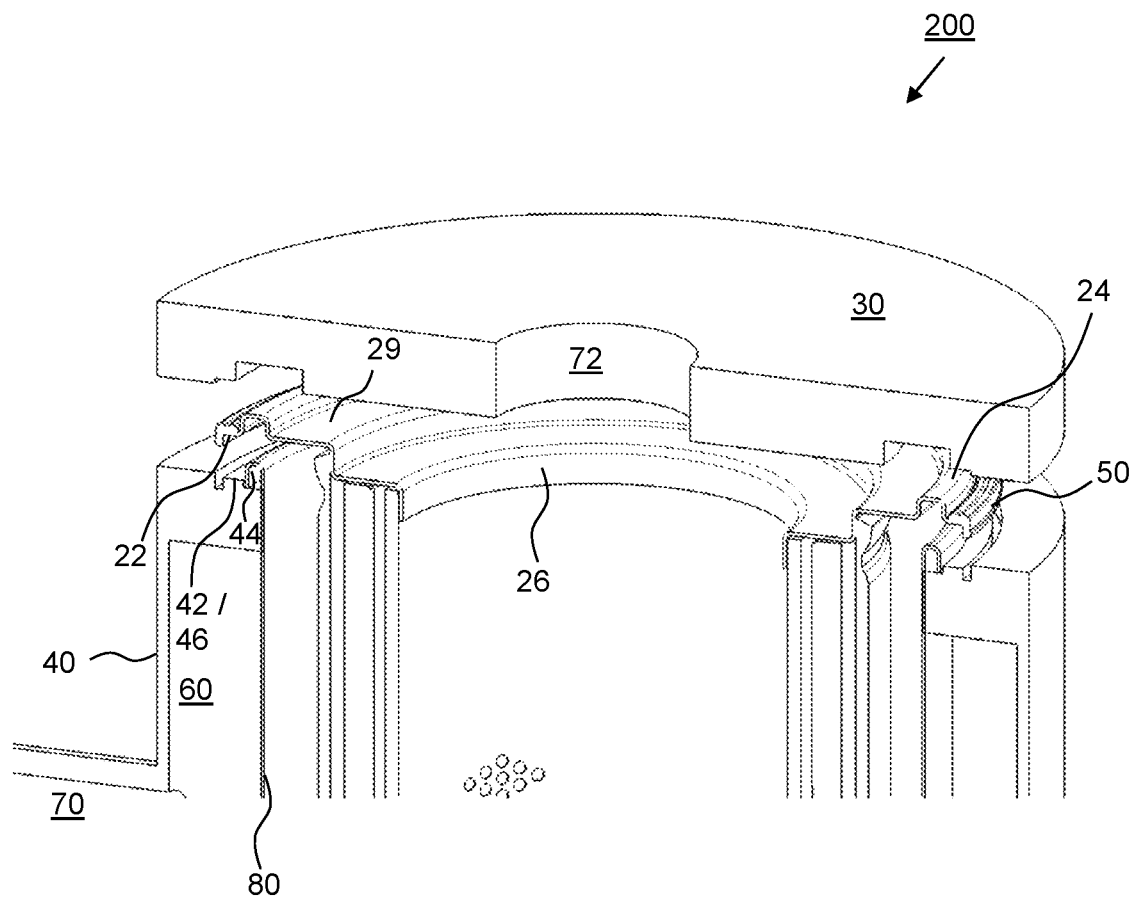
FIG. 7 shows a longitudinal section of an exploded illustration of the liquid separator of FIG. 3.
Figure 8:
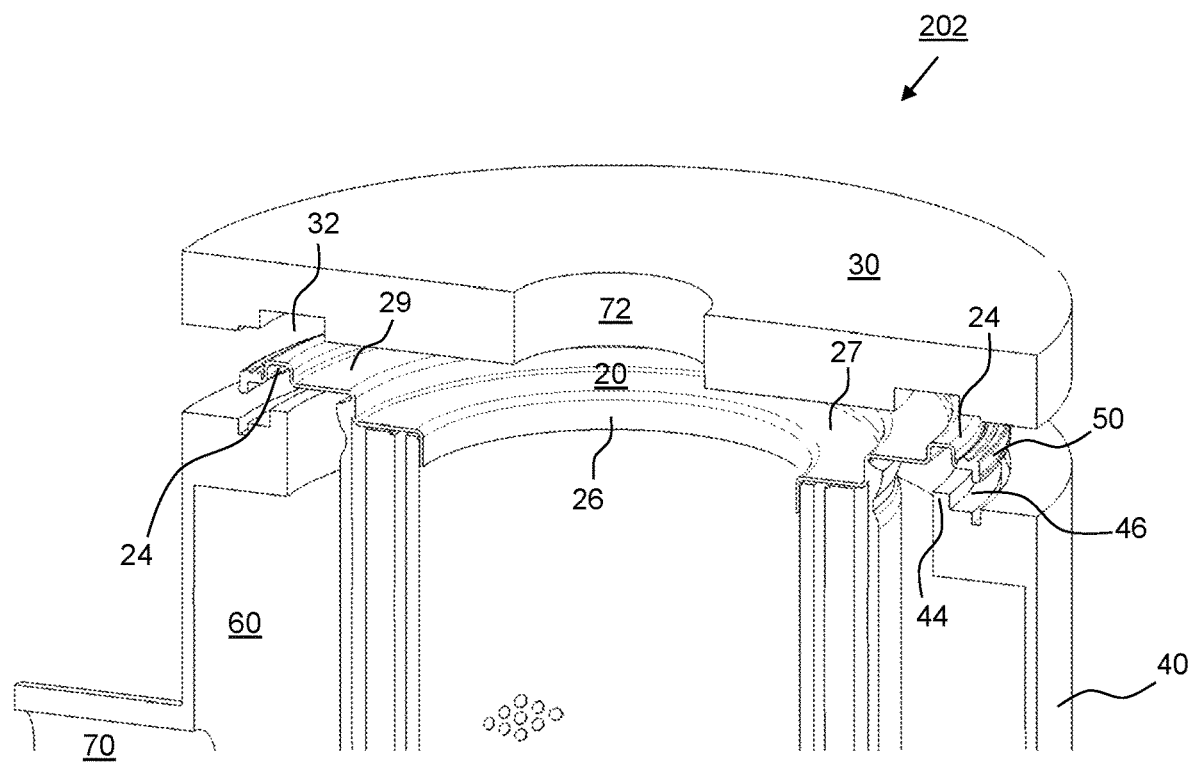
FIG. 8 shows a longitudinal section of an exploded illustration of the liquid separator of FIG. 5.
Figure 9:
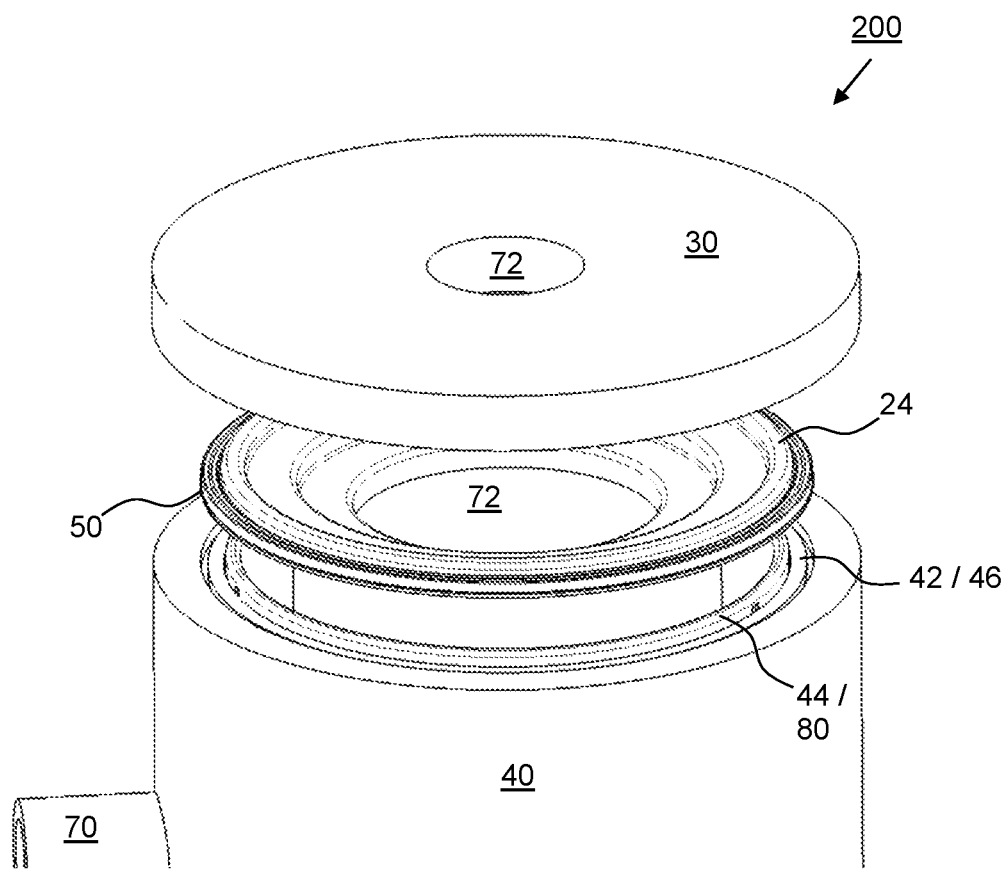
FIG. 9 shows in perspective exploded illustration the liquid separator of FIG. 3.
Figure 10:
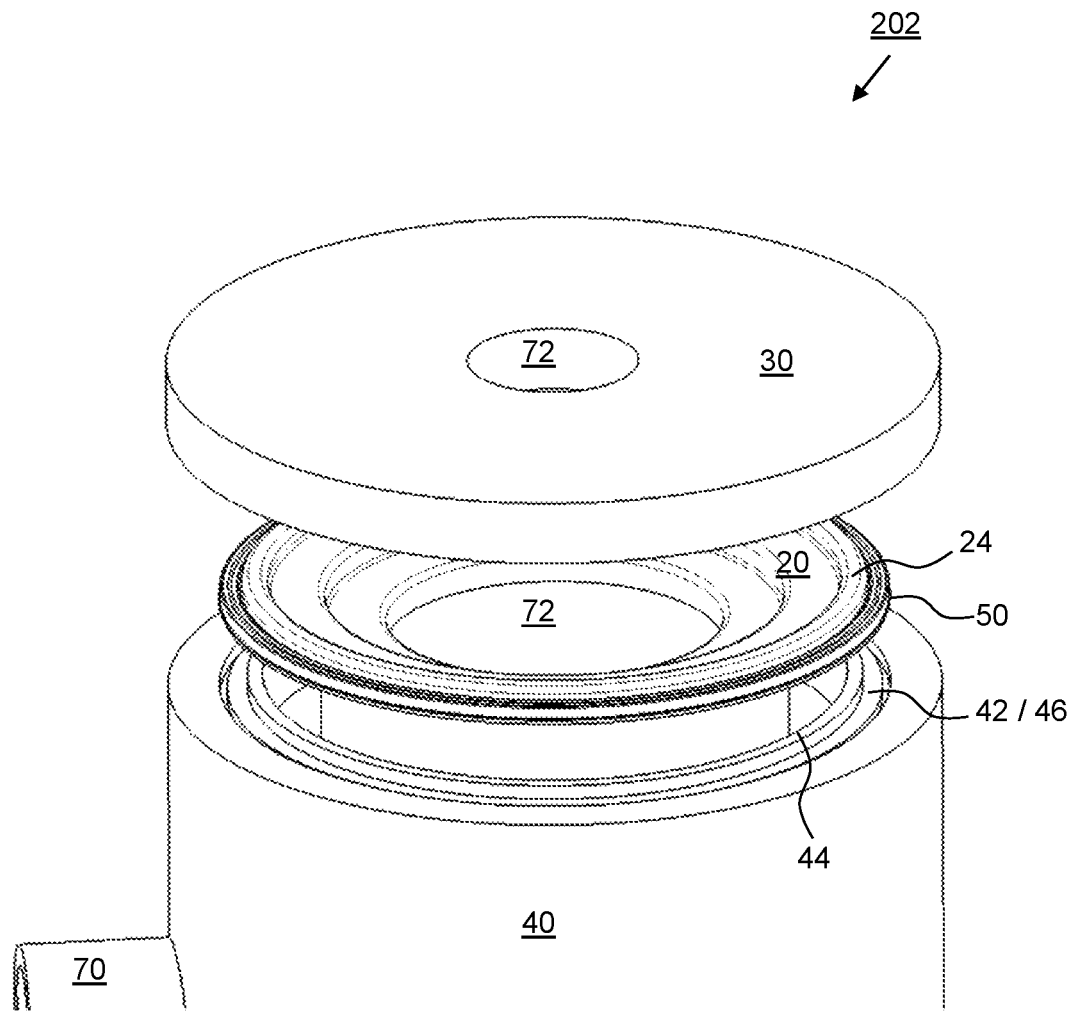
FIG. 10 shows in perspective exploded illustration the liquid separator of FIG. 5.

FIGS. 4 and 6 show a detail view of the flange 20 in the housing of the liquid separator 200, 202. The flange 20, more precisely, a support surface 22 of the flange 20 arranged at the radially outer rim of the flange 20 is positioned directly on the housing body 40, namely on an upper support region 42 of the housing body 40 facing the cover 30. A seal ring 50 that is L-shaped in longitudinal section is resting on the support surface 22, and the cover 30 is resting on the L-shaped seal ring 50.

The cover 30 has a flange cutout 32 configured for receiving the support surface 22. Moreover, the support region 42 has a flange cutout 46 configured for receiving the support surface 22. The flange cutout 46 of the housing body 40 and the flange cutout 32 of the cover 30 form together a seal chamber 46, 32 in which the L-shaped seal ring 50 is arranged such that the seal chamber 46, 32 is sealed relative to the environment, i.e, relative to the atmospheric pressure.

The groove 24 aids in positioning the seal 50 upon insertion of the filter insert 100 into the housing of the liquid separator 200; 202 because, by means of the guiding action provided by the groove 24 and the counter groove 44, the seal 50 can be inserted into the seal chamber 46 in the manner of a loose fit.

The flange cutout 32 of the cover 30 is designed such that the groove 24 can be arranged only in the flange cutout 32 of the cover 30 when the groove 24 is arranged spatially matched to the counter groove 44. In this context, the axial extension of the flange cutout 32 of the cover 30 corresponds substantially to the axial extension of the groove 24. This has the effect that the cover 30 can be arranged on the housing opening in a closing manner only when the counter groove 44 engages the groove 24.

In a radially outer region of the housing which is bordering the seal chamber 46, 32, the cover 30 and the housing body 40 are resting on block.

The embodiments of the present invention illustrated in FIGS. 1 to 10 have the advantage that by the interaction of the groove 24 and the counter groove 44 upon insertion of the filter insert 100 into the housing a guiding action is provided which has the effect that the separation element 10 is centered relative to the housing body 40 and/or to the air baffle 80, the seal element 50 is arranged in its seal seat, and the filter insert 100 can be installed only in a housing that is matching it.

LIST OF REFERENCE CHARACTERS

10 separation element configured for separating oil and oil aerosol from air by means of the coalescence principle, in particular hollow cylindrical coalescer, for example, of glass fiber and/or of plastic material, for example, of nonwoven

20 flange, in particular end face end disk, of the filter insert 100 for supporting the filter insert 100 between the cover 30 and the housing body 40 of the liquid separator 200, 202

22 support surface of the flange 20 (compare FIG. 1)

24 guide structure or differentiation structure or positioning structure, in particular groove, for example, n-shaped groove

26 axially extending region of the radially inner step of the flange 20

27 radially extending region of the radially inner step of the flange 20

28 axially extending region of the radially outer step of the flange 20

29 radially extending region of the radially outer step of the flange 20

30 cover or housing cover, in particular pressure container cover or pressure storage container cover, for example, housing socket 32 flange cutout of the cover 30 for receiving the support surface 22
40 body of the housing or housing body, in particular cylindrical pressure-resistant housing body or pressure container bottom part or pressure storage container bottom part
42 support region, in particular support surface, of the housing body 40
44 counter structure, in particular counter groove
46 flange cutout of the housing body 40 for receiving the support surface 22
50 seal element, in particular seal ring L-shaped in longitudinal section
60 annular gap arranged between cylindrical housing body 40 and hollow cylindrical separation element 10
70 raw air inlet for letting in raw air, originating from the connection element and laden with liquid, into the housing body 40
72 clean air outlet for letting out compressed air purified by the liquid separator 200, 202
80 air guide element, in particular air baffle, for example, shield
90 bottom-side end disk or bottom-side end cap or bottom element for covering the hollow cylindrical bottom side of the filter insert 100
92 liquid collection region, in particular oil collection region, which is correlated with the bottom-side end disk 90, arranged radially inside of the separation element 10, and configured for collecting the liquid separated by the separation element 10 (compare FIGS. 3 and 5)
100 filter insert
110 liquid collection volume, in particular oil collection volume or oil collection chamber, for collecting liquid separated by preseparation, in particular by gravity and/or by centrifugal force for tangential inflow of the raw air into the housing body 40 (compare FIGS. 3 and 5)
200 liquid separator, in particular compressed air dehumidifying device, for example, air/oil separator element, first embodiment (compare FIGS. 3, 4, 7, and 9)
202 liquid separator, in particular compressed air dehumidifying device, for example, air/oil separator element, second embodiment (compare FIGS. 5, 6, 8, and 10)

What is claimed is:

1. A filter insert configured to be installed in a housing of a liquid separator, the filter insert comprising:
   a hollow cylindrical separation element configured as a hollow cylindrical coalescer configured to separate a liquid from a gas flow;
   a flange arranged at an end face of the hollow cylindrical separation element, wherein the flange is configured to be arranged exchangeably between a cover of the housing and a cylindrical body of the housing;
   wherein the flange comprises a support surface arranged at a radially outer rim of the flange, wherein the support surface is configured to be supported on an upper support region of the housing that is facing the cover of the housing;
   wherein the flange comprises a guide structure configured to determine a position of the flange on the upper support region of the housing;
   wherein the guide structure is configured to receive substantially with precise fit a counter structure correlated with the liquid separator;
   wherein the guide structure comprises a groove-like axial elevation of the flange, wherein the groove-like axial elevation of the flange projects axially away from the end face of the separation element.

2. The filter insert according to claim 1, wherein the groove-like axial elevation of the flange is annular and is arranged concentrically about a central circular cutout of the hollow cylindrical separation element.

3. The filter insert according to claim 1, wherein the guide structure is open toward the upper support region of the housing in a position of use of the flange.

4. The filter insert according to claim 1, wherein the flange is configured stair-like, viewed in a longitudinal section view, and comprises a radially inner step and a radially outer step that is sequentially arranged relative to the radially inner step, wherein an axially extending region of the radially inner step is configured to contact a central cutout of the hollow cylindrical separation element, wherein a radially extending region of the radially inner step is configured to cover the end face of the hollow cylindrical separation element, wherein the support surface of the flange is correlated with a radially extending region of the radially outer step, and wherein the guide structure is arranged at a radially extending region of the radially outer step.

5. The filter insert according to claim 1, wherein the guide structure projects axially past the support surface of the flange.

6. The filter insert according to claim 1, further comprising a seal element arranged captively at the support surface of the flange, wherein the seal element is arranged such at the support surface of the flange that the seal element, in a position of use of the filter insert in the housing of the separation element, is arranged between the flange and the housing of the liquid separator and seals the housing of the liquid separator relative to an ambient pressure.

7. The filter insert according to claim 6, wherein the seal element is an L-shaped seal ring.

8. The filter insert according to claim 1, wherein the support surface of the flange is arranged radially displaced relative to the hollow cylindrical separation element such that the hollow cylindrical separation element is arrangeable at a distance from the cylindrical body of the housing and an annular gap is formed between the cylindrical body of the housing and the hollow cylindrical separation element, wherein the annular gap is configured to be flowed through spirally by the gas flow that is laden with a liquid and flows through the cylindrical body of the housing, and wherein the guide structure is configured to define dimensions of the annular gap by determining a position of the flange on the upper support region of the housing.

9. A method comprising:
   providing a filter insert according to claim 1 and installing said filter insert in a liquid separator, wherein the liquid separator comprises a housing comprising a housing opening, a cylindrical body, and a cover configured to close the housing opening of the housing.

10. A method comprising:
    separating oil from compressed air by using a filter insert according to claim 1 in a liquid separator, wherein the liquid separator comprises a housing comprising a housing opening, a cylindrical body, and a cover configured to close the housing opening of the housing, wherein the liquid separator is correlated with a compressed air system that is supplied by an oil-lubricated connection element.

11. A liquid separator comprising:
a housing comprising a housing opening, a cylindrical body, and a cover configured to close the housing opening of the housing;
a filter insert comprising:
a hollow cylindrical separation element configured as a hollow cylindrical coalescer configured to separate a liquid from a gas flow; and
a flange arranged at an end face of the hollow cylindrical separation element, wherein the flange is configured to be arranged exchangeably between the cover of the housing and the cylindrical body of the housing;
wherein the flange comprises a support surface arranged at a radially outer rim of the flange, wherein the support surface is configured to be supported on an upper support region of the housing that is facing the cover of the housing;
wherein the flange comprises a guide structure configured to determine a position of the flange on the upper support region of the housing;
wherein the liquid separator comprises a counter structure, wherein the guide structure of the flange is configured to receive substantially with precise fit the counter structure;
wherein the guide structure comprises a groove-like axial elevation of the flange, wherein the groove-like axial elevation of the flange projects axially away from the end face of the separation element.

12. The liquid separator according to claim 11, wherein:
the support surface of the flange in a closed state of the housing is clamped between the cover of the housing and the cylindrical body of the housing;
wherein the housing comprises at least one flange cutout configured to receive the support surface of the flange; and
wherein a radius of the flange is smaller than a radius of the housing such that, at a radially outer region of the housing bordering the flange cutout of the housing, the cover of the housing contacts directly the cylindrical body of the housing.

13. The liquid separator according to claim 11, wherein the housing comprises a raw air inlet arranged tangentially at the cylindrical body of the housing and configured to connect to a liquid-lubricated connection element of a compressed air system and configured to let in compressed air, laden with liquid and originating from the connection element, tangentially into the cylindrical body of the housing, wherein an annular gap is arranged between the cylindrical body of the housing and the separation element of the filter insert, wherein the liquid separator is configured such that the compressed air flowing in through the raw air inlet flows spirally through the annular gap and flows into the separation element of the filter insert in a region of the separation element facing away from the cover of the housing.

14. The liquid separator according to claim 11, further comprising an air guide element arranged at a distance from the cylindrical body of the housing and configured to guide air flowing into the cylindrical body of the housing in a tangential direction, wherein the counter structure of the liquid separator is arranged at a region of the air guide element facing the flange in a position of use of the filter insert.

15. The liquid separator according to claim 11, wherein the counter structure of the liquid separator is arranged in a region of the cylindrical body of the housing facing the flange in a position of use of the filter insert.

* * * * *